United States Patent Office 3,730,858
Patented May 1, 1973

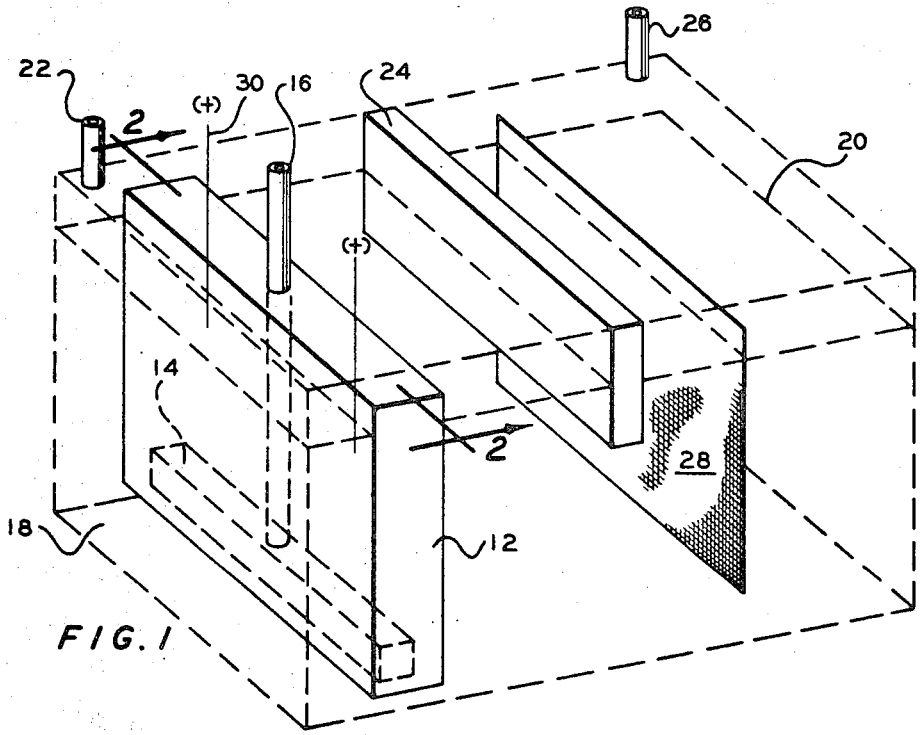
FIG. 1
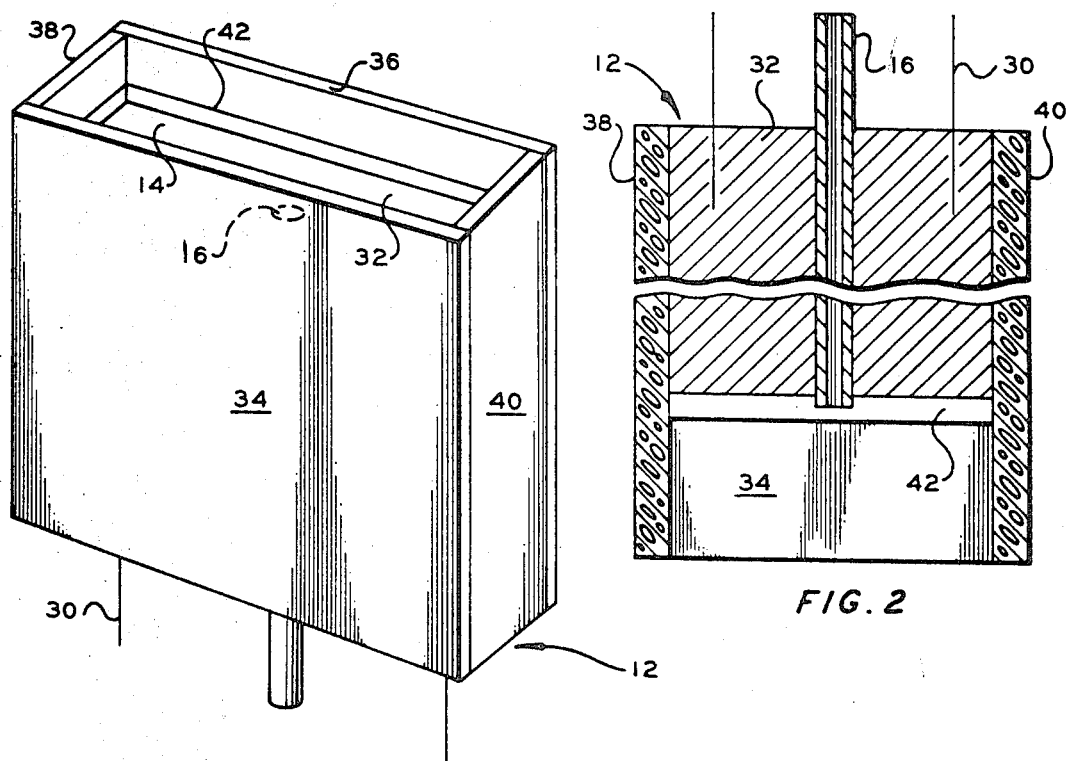
FIG. 3
FIG. 2

3,730,858
POROUS ELECTRODE HAVING CAVITY WITH IMPERVIOUS DOME
Keith A. Williams, Bartlesville, Okla., assignor to Phillips Petroleum Company
Continuation of application Ser. No. 74,133, Sept. 21, 1970, which is a continuation of abandoned application Ser. No. 739,506, June 24, 1968. This application Feb. 14, 1972, Ser. No. 226,040
Int. Cl. B01k 3/00; C07b 29/06
U.S. Cl. 204—59 R  14 Claims

ABSTRACT OF THE DISCLOSURE

In an electrochemical process, the reaction takes place within the confines of a porous electrode element. The bottom of this electrode element has a cavity open to the bulk of the electrolyte. Gaseous or vaporous feed materials are introduced into this cavity; a portion of the inner surfaces of the walls of this cavity are sufficiently impervious so as to cause a gas cap to form in the upper portion of the cavity. This allows the feed materials to be distributed evenly throughout the entire horizontal span of the cavity. The feed materials then pass out of the impervious dome and into and upward through the porous reaction section of the electrode without contact with the bulk of the electrolyte and are converted to the desired products while within the confines of the electrode element.

---

This application is a continuation of my copending application Ser. No. 74,133, filed Sept. 21, 1970, now abandoned, which in turn was a continuation of my then pending application Ser. No. 739,506, filed June 24, 1968, now abandoned.

BACKGROUND OF THE INVENTION

This invention relates to electrode elements and processes for electrochemical conversion.

Porous electrode elements, particularly porous carbon anodes, are widely used in electrochemical conversion reactions. Generally, the utilization of such elements has involved immersing the element in an electrolyte and passing the electric current through this electrolyte from this element to an oppositely charged element. At least a portion of the materials within the electrolyte is converted into products at one or both electrodes. In a variation of this process, an additional feedstock for the conversion process is bubbled into the electrolyte through a porous electrode element, such as a porous carbon anode, to provide still different products.

Very recently it has been discovered that the reaction in an electrochemical conversion operation can be carried out within the confines of the porous electrode element itself. This type of operation is of particular utility in electrochemical fluorination because it makes possible a simple one-step route, at relatively high conversions, to partially fluorinated products which had previously been difficult to obtain. Carrying out the fluorination reaction within the porous anode, in addition to making possible the direct production of partially fluorinated products, also allows operation at higher rates of conversion, and without the formation of substantial amounts of cleavage products generally produced by the older methods when operating at high conversion rates. The feed to be fluorinated is introduced into the porous anode at a point near its bottom and the fluorinated mixture exits at the top of the anode, generally above the electrolyte level. Passage of feed into the bulk of the electrolyte is avoided.

It is apparent that if the reaction is to take place within the electrode element, larger electrodes are desirable in order to increase the available surface area wherein the reaction takes place. However, with larger electrodes, it has been found that nonuniform distribution of feed material can result within the electrode. Moreover, because the process is capable of high conversions, it utilizes relatively low feed flows. Such low flows are, ordinarily, more difficult to distribute uniformly.

Nonuniform distribution of feed material results in a loss of the advantage of this type of operation with respect to the production of only partially fluorinated products; this is because in a system, for instance utilizing a KF·2HF electrolyte, the fluorinating species are generated continuously throughout the submerged surface of the electrode element and thus, in areas where feed is not distributed properly, the excess of fluorination species will fluorinate the available feed all the way to perfluoro products, or even produce undesirable cleavage products. Also, nonuniform feed distribution can result in sudden contact of accumulated fluorine with accmulated feed material or hydrogen from the other electrode element to give an explosive reaction. It can thus be seen that uniform distribution of the feed material and, consequently, uniform contact of the feed material with the electrolyte at the point of reaction are of prime importance.

SUMMARY OF THE INVENTION

It is an object of this invention to provide an improved process and apparatus wherein the reaction of an electrochemical conversion process using a porous electrode element is carried out within the confines of the electrode element; and it is yet a further object of this invention to provide for uniform distribution of feed to a porous electrode element.

In accordance with this invention, a cavity, into which gaseous or vaporous feed material is introduced, is provided in the bottom of a porous electrode element for an electrochemical conversion process in which the reaction takes place within the confines of the porous element, selective portions of the inner wall surfaces of this cavity being impervious so as to allow the formation of a gas cap of the feedstock in the upper portion of said cavity and thus to effect uniform distribution of said feedstock.

BRIEF DESCRIPTION OF THE DRAWINGS

In the drawings, forming a part hereof, in which like reference characters denote like parts in the various views, FIG. 1 is a schematic representation of an electrochemical cell utilizing an anode having an open cavity in accordance with this invention; FIG. 2 is a cross section along lines 2—2 of FIG. 1; FIG. 3 is a perspective view of an inverted element.

DESCRIPTION OF THE PREFERRED EMBODIMENTS

The inner walls of the upper portion of the cavity can be rendered sufficiently impermeable to allow the accumulation of a gas cap by any suitable means. For instance, these walls can be painted with an impermeable coating or cement which is compatible with the system. This cement can make the walls impermeable either by virtue of forming a continuous film over the inner walls or simply by virtue of plugging the exposed layer of pores. A cement comprising powdered carbon in a curable binder, for instance, is particularly suitable for carbon electrodes. Also suitable is the application of a polymer-containing coating composition or a film of molten polymer. Particularly suitable is a coating of a polymer of at least one mono-1-olefin having 2 to 8 carbon atoms per molecule. Care should be taken so that only the surface of that portion of the porous wall to be treated is made less permeable to the gaseous or vaporous feed. If the porosity of the entire thickness of the electrode element is reduced, the necessary entry of the feed into the electrode proper can be seriously hampered or even precluded. In a fluorination system comprising an HF electrolyte, coatings made of 1-olefin polymers are particularly suitable since the polymer is fluorinated to a very stable and durable material. Alternatively, an insert, for instance made of a synthetic plastic such as Teflon (trademark for polytetrafluoroethylene), can be physically affixed in place within the upper portion of the cavity, or the electrode element can be formed initially with selective portions of the inner wall impermeable.

Figure 5:
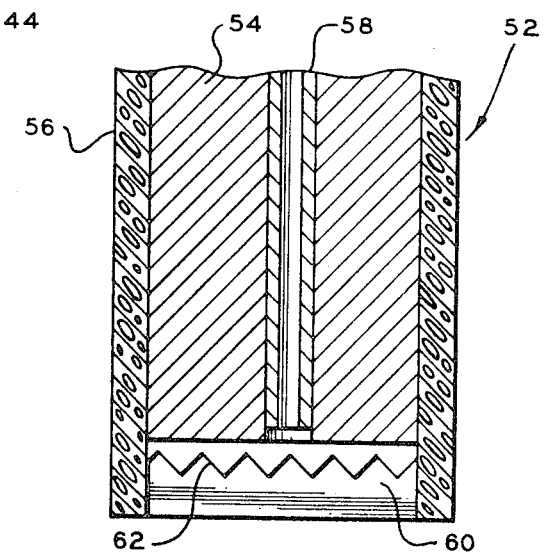
FIG. 5 is a longitudinal cross section of a lower portion of an anode in accordance with another alternative embodiment of the instant invention.

In embodiments such as those shown in FIGS. 2 and 5 wherein the central core section is made of impermeable material, the only portions which must be rendered impermeable are the inner sidewalls around the upper portion of the cavity adjacent to said core. Alternatively, a shallow cavity can be machined into the impermeable core to provide a dome whose top and sides consist of the dense core material. In embodiments utilizing porous material throughout the electrode element, the top and a portion of the sidewalls of the cavity must be rendered impermeable. The portions of the inner walls which are rendered impermeable can vary widely but generally the upper $1/100$ to $1/2$ of the walls of the cavity will be rendered impermeable.

While this invention is applicable to any porous electrode element having a cavity in open communication with electrolyte, it is particularly useful in electrode elements having a lateral dimension of greater than 6 inches wide since it is these larger electrodes where the problem of uneven feed distribution, which the instant invention alleviates so spectacularly, is most acute. By utilizing the instant invention, feedstock can be introduced into a cavity open to the bulk of the electrolyte from a single point in a large electrode and yet the feedstock is absorbed into the electrode element around the periphery in a remarkably uniform manner. This more uniform initial introduction of the feedstock effects a remarkable and unexpected simplification in the overall operation of the cell.

The electrode material itself is made of material which is not wetted by the electrolyte being used. For instance, in systems utilizing HF-containing electrolytes, porous carbon is an ideal material for the electrode element. Because the gaseous feed is so much more compatible with the porous carbon than is the electrolyte, the gaseous feed is rapidly absorbed into the pores of the porous electrode element. The presence of a gas cap therefore allows an opportunity for the feed to flow out evenly across the entire undersurface of the cavity and therefore be distributed evenly throughout the electrode element. It is apparent, therefore, that in addition to coatings which are completely impermeable, a relatively impermeable coating which simply reduces the permeability to a point where the rate of absorption is far below the rate of feed introduction can also be used. (As is well known, most coating materials which are generally regarded as impervious are nevertheless permeated to a slight extent by gaseous materials, anyway.)

Only a portion of the sidewalls of the cavity need be rendered impermeable and the impermeable area can be in any convenient pattern which will provide the desired gas cap. For example, the upper portion of the sidewall can be painted, as in FIG. 2, such that the lower edge of the painted area is a simple horizontal line about midway up the sidewall. Alternatively, the painted portion can have a sawtooth pattern as in FIG. 5, or the pattern can be that of a segment of a circle as in FIG. 4. A large number of such patterns are applicable. Of course, for best effectiveness, the electrode, as well as the pattern of the impermeable area, must be level in respect to the horizontal plane.

The size and shape of the cavity itself can vary depending on the size and shape of the electrode element. With a cylindrical electrode element a hole can simply be drilled part way into the bottom of the electrode. With a slab type electrode the cavity can take the form of an elongated rectangular recess closed on all sides but the bottom.

Generally, the cavity, as shown for instance in the figures, will extend upward from the lowermost extension of the bottom of the porous outer section a distance equal to between $1/100$ and $1/4$ of the total height of the porous electrode element, and represents a volume equal to $1/100$ to $95/100$ of the volume of that portion of the electrode element containing the cavity.

The porous electrode element can be any porous electrode material suitable for electrochemical conversion reactions taking place within the confines of the electrode material, specifically within the pores of the electrode material. It can consist of a single piece of uniform porous carbon. It can have a varying porosity with smaller pores at the bottom and larger pores at the top so as to enable deeper immersion into the electrolyte. It can have varying porosity from outside to inside, with the smaller pores in the core section and the larger pores on the outside in contact with the electrolyte. It can also be a three-section "sandwich" electrode element having large pores in the outer section surrounding a central core, said large pores being in contact with the electrolyte, and the core being comprised of an impermeable current conducting material such as nonporous carbon or metal as shown in FIGS. 2 and 5. It is generally desirable that the outer section of the composite electrode element be comparatively thin for uniformity of conversion. For example, outer sections of less than 1 inch in thickness, sometimes less than 0.5 inch, can be utilized with advantage. For convenience of description, the electrode elements of this invention will be characterized by having a central core with outer porous sections extending below this core, the lower surface of the core and the inner surfaces of the extended portions defining a cavity, although it is understood that the core may be either an impermeable or less permeable entity or merely an extension of the porous outer portion, in which latter case the electrode element is an integral unit and the "core" is just by definition that portion of the integral unit above the cavity.

In the porous electrode element, the average pore diameter of the porous reaction section will generally be in the range of from 1 to about 150 microns, preferably between 40 and 140 microns and still more preferably between 50 and 120 microns. These values depend somewhat on the depth of immersion of the electrode with deeper immersions requiring somewhat smaller pores. Generally, the permeability of such electrodes will be in the range of 0.5 to 75 darcys, preferably from about 5 to about 75, and still more preferably 10 to 70, darcys. In general, the total porosity will be in the range of about 15 to about 60 percent.

The feed material is discharged into the cavity where it is rapidly absorbed into the porous electrode element. While it is not desired to limit the invention to any theory of operation, it is believed that the electrolyte partially penetrates the electrode through some of the larger pores. The feed material distributes itself throughout the porous electrode and migrates to near the outer surface to form a three-phase boundary of feed, electrolyte, and electrode element, at which point the reaction takes place. The product and unreacted feed then migrate up to the portion of the electrode element above the electrolyte level where they are collected, without ever having broken out into the bulk of the electrolyte (the feed is momentarily in contact with the bulk of the electrolyte when it emerges from the feed pipe and collects in the cavity).

The porous portion of the porous electrode elements of the electrode assemblies of the instant invention can be fabricated from any suitable conducting porous electrolyte resistant material which is compatible with the system, for instance nickel, iron, various metal alloys, and carbon, which is not wetted by the electrolyte. By "not wetted" is meant that the contact angle between the electrolyte and the electrode must exceed 90 degrees in order that capillary forces will prevent substantial invasion of the small pores of the porous element by the electrolyte. If the specific electrolyte chosen does wet the specific electrode material, the electrode can be conventionally treated by an antiwetting agent. Porous carbon, which is economical and readily available in ordinary channels of commerce, is presently preferred for said porous element and is useful in many systems. In many instances, it is advantageous to provide a metal element in contact with the porous carbon element. For instance, a porous carbon anode can have a nickel screen wrapped around it.

The electrode assemblies of the invention can be employed in any convenient cell configuration or electrode arrangement. The only requirements are that the cell body and the electrodes in the cell be fabricated of materials which are resistant to the action of the contents of the cell under the reaction conditions. Materials such as steel, iron, nickel, polytetrafluoroethylene (Teflon), carbon, and the like can be employed for the cell body.

The electrode assemblies of the instant invention can be employed in a wide variety of electrochemical conversion processes, both aqueous and nonaqueous, in which the porous electrode is not wetted by the particular electrolyte being used, and wherein the reaction takes place within the confines of the electrode element. Some examples of such processes are electrochemical halogenation, electrochemical cyanation, and cathodic conversions such as the reduction of alcohols to hydrocarbons, the reduction of acids to alcohols, or the reduction of olefins to paraffins. One electrochemical conversion process in which the electrode assemblies of the instant invention are particularly valuable is the electrochemical fluorination of fluorinatable materials in the presence of an essentially anhydrous liquid hydrogen fluoride-containing electrolyte.

Referring now to the drawings, particularly FIG. 1, there is shown in schematic representation a complete electrochemical conversion cell having a porous electrode element 12. In the bottom of porous electrode element 12 is cavity 14. Feed is introduced into cavity 14 via line 16. Said porous electrode element 12 is disposed in cell container 18. The upper end of said porous electrode element is above the level of the electrolyte in said container as depicted by reference character 20. Thus, the upper end surface of porous electrode element 12 comprises a second surface for withdrawing unreacted feestock product from the pores of porous electrode element 12, the permeable portion of the inner wall of cavity 14 comprising a first surface for the introduction of feed materials into the pores of said porous element 12. Conduit 22 comprises a second conduit means for withdrawing product and unreacted feedstock from within the pores of porous electrode element 12. If desired, the space above the electrolyte can be divided by a partition 24 extending from the top of the cell to below the level of the electrolyte to keep the anode product separated from the cathode product; or a conventional cell divider can be employed to divide the cell into an anode compartment and a cathode compartment. However, such a divider is not essential. A separate conduit 26 removes material generated at cathode 28. Current collectors 30 are imbedded in the central portion of element 12.

Referring now to FIGS. 2 and 3, there is shown electrode element 12 of FIG. 1. This element is shown in cross section in FIG. 2 and is shown inverted in FIG. 3 so as to reveal the interior of cavity 14. As can be seen, this electrode is a slab type element having an inner core of impervious carbon 32. Cemented to the sides of core 32 are porous carbon slabs 34 and 36; cemented to the ends of core 32 are porous carbon slabs 38 and 40. Slabs 34, 36, 38 and 40 extend down below the lowermost portion of core 32, the inner walls of this extension and the lower surface of core 32 defining cavity 14. A strip of impermeable paint 42 is shown covering the portion of the inner surface of the extension of slabs 34, 36, 38 and 40 adjacent core 32. Since core 32 is impermeable, a gas cap forms filling the entire space between the lowermost extension of strip 42 and the undersurface of core 32. The gas, after filling this space, flows out evenly under the edge of painted strip 42 and is rapidly and uniformly absorbed into the porous slabs.

Figure 4:
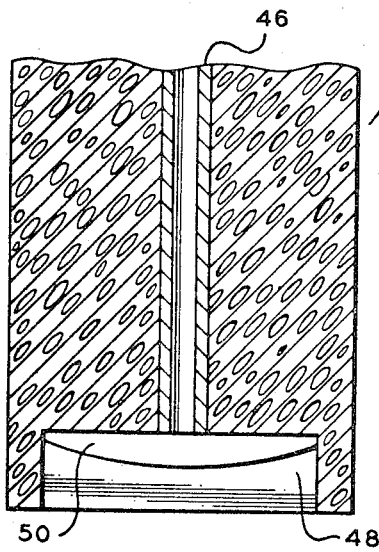
FIG. 4 is a longitudinal cross section of a lower portion of a rectangular anode in accordance with an alternative embodiment of the instant invention.

In FIG. 4 there is shown a rectangular electrode element 44 comprised of uniformly porous carbon. Centrally disposed within element 44 is combination current collector and feed introduction means in the form of metallic tube 46. In the bottom portion of element 44 is cavity 48. The inner walls of cavity 48 and the portion of electrode element 44 defining the top of cavity 48 (not shown since this is a cross-sectional view) are painted with an impervious coating 50. Coating 50 is applied in a contoured manner so as to allow the gas from the gas cap to preferentially escape around the periphery of the electrode element at points farthest away from the feed introduction means. This can also be effected by making the portion of the electrode element defining the top of the cavity substantially less permeable in the area adjacent to the feed introduction means 46.

FIG. 5 shows a cross-sectional view of the lower portion of a similar rectangular electrode element 52 in accordance with another alternative embodiment of the instant invention, having an impermeable central core portion 54 and porous carbon outer sections 56. Centrally disposed within core 54 is combination current collector feed introduction means 58. The undersurface of core 54 and extensions of sections 56 below this core define cavity 60. The portion of the inner surface of outer section 56 adjacent core 54 is painted, thus providing an impermeable strip 62 around all four sides. Strip 62 has a sawtooth configuration at the lower portion thereof so as to promote essentially uniform distribution of the gas flowing under the impermeable barrier even if the electrode is not disposed exactly level.

Figure 6:
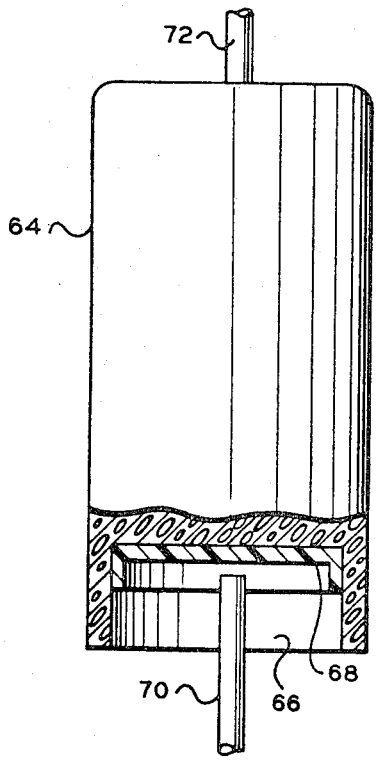
FIG. 6 is a side elevational view shown partially in section of a cylindrical anode in accordance with still another alternative embodiment of the instant invention.

FIG. 6 shows a cylindrical electrode 64 having cavity 66. Disposed in the upper portion of cavity 66 is Teflon insert 68 which covers the upper portion of the cavity and extends down the sidewalls of the cavity a short distance. Feed is introduced into this cavity via conduit 70 which enters from the bottom. Current collector 72 is imbedded in the upper portion of anode 64.

Figure 7:
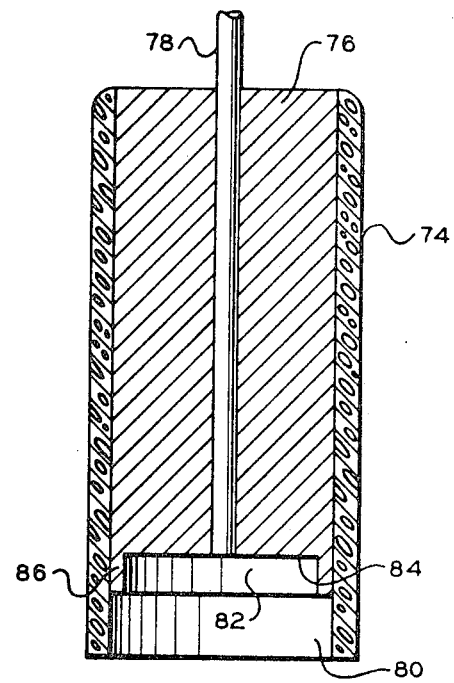
FIG. 7 is a cross-sectional view of a cylindrical electrode in accordance with yet another alternative embodiment of the invention.

Referring now to FIG. 7 there is shown a cylindrical electrode having outer porous section 74 and impervious inner core 76. Disposed centrally within inner core 76 is combination current collector and feed introduction line 78. The undersurface of core 76 and the inner surfaces of sections 74 extending below said undersurface define open cavity 80. A recessed portion of the lower surface of impervious core 76 provides for a gas cap or dome 82. Since surface 84 and core projections 86 are impermeable the feed will fill dome 82 and flow out evenly over the entire periphery of the cavity to be absorbed by slabs 74.

Many conventional parts, such as electrical circuitry, flow regulators, and the like have not been shown for the purpose of simplicity but their inclusion is understood by those skilled in the art and is within the scope of the invention.

Example

Ethylene dichloride was fluorinated to Freon 114 (1,1-dichlorotetrafluoroethane) and other fluorinated products in an electrochemical cell. The cell contained molten KF·2HF as the electrolyte and an iron grid cathode.

The anode was a composite fabricated from a rectangular slab of conductive but essentially impervious carbon (National Carbon C–13) to which was bonded, on each of four sides, a ½-inch thickness of relatively porous carbon sheet (National Carbon NC–45 which has an average pore size of about 55 microns, an average porosity of about 51 percent, and a permeability of about 20 darcys). The exterior dimensions of the anode were 14 in. x 12 in. x 1⅞ in. and the outer layer of the porous carbon extended 1 inch below the core section as a skirt to form a feed chamber in the shape of a rectangular cavity. Metal pins were inserted into the top of the anode as current collectors.

The inside wall of the skirt portion of the anode was then painted, in a sawtooth pattern similar to FIG. 5, to render a portion of the wall sufficiently impermeable to the feed to form an impermeable dome which would permit the formation of a gas cap in the feed chamber. The painting was done by brushing on a film of a conventional carbon cement (National Carbon C–3 cement, a water-thinned composition with a particulate carbon base and a thick cream consistency). The coating was cured by baking for about 4 hours at about 250° F.

The anode was mounted and leveled in the cell and used in a fluorination run which lasted about 3 days. The ethylene dichloride was fed, at a rate of about 800 ml./hr., into the domed feed chamber by a feed pipe passing down through the core of the anode and communicating with the feed chamber. The 14-inch anode was immersed about 12 inches into the electrolyte. The fluorinated feed exited the anode above the electrolyte level and passed out of the cell together with the hydrogen generated at the cathode. During the run, the cell operated at about 97° C., 500 amperes, and at about 8.3 volts.

Near the end of the run, a sample of the cell effluent was collected and analyzed. The results of the analysis, excluding hydrogen, are shown below.

| Freon: | Wt. fraction |
|---|---|
| 150 ($CH_2Cl$—$CH_2Cl$) | 0.4499 |
| 141 ($CHClF$—$CH_2Cl$) | 0.1802 |
| 132 ($CHClF$—$CHClF$) | 0.1083 |
| 132b ($CClF_2$—$CH_2Cl$) | 0.0518 |
| 123a ($CHClF$—$CClF_2$) | 0.0863 |
| 114 ($CClF_2$—$CClF_2$) | 0.0453 |
| 140 ($CHCl_2$—$CH_2Cl$) | 0.0195 |
| 131 ($CHCl_2$—$CHClF$) | 0.0108 |
| 131a ($CH_2Cl$—$CCl_2F$) | 0.0086 |
| 122a ($CHClF$—$CCl_2F$) | 0.0151 |
| 113 ($CCl_2F$—$CClF_2$) | 0.0052 |
| 142a ($CHClF$—$CH_2F$) | 0.0049 |
| 133 ($CHClF$—$CHF_2$) | 0.0037 |
| 133b ($CClF_2$—$CH_2F$) | 0.0012 |
| 124a ($CHF_2$—$CClF_2$) | 0.0067 |
| 115 ($CClF_2$—$CF_3$) | 0.0016 |

During the run, the cell operated smoothly without the arcing, flashing, or black-appearing product which is characteristic of nonuniform feed distribution which occurs when an electrode as wide as this operated in this manner from a single feed point and without the coated feed chamber walls. Thus, this run and the data above show that the invention is effective in improving the electrochemical fluorination process wherein ethylene dichloride is converted to Freon 114 (and products convertible to Freon 114 on recycle).

While this invention has been described in detail for the purpose of illustration, it is not to be construed or limited thereby but is intended to cover all changes and modification within the spirit and scope thereof.

I claim:

1. A process for the electrochemical conversion of a feedstock, which process comprises:

passing an electric current through a current-conducting electrolyte composition contained in an electrolysis cell provided with a first electrode element and a porous second electrode element, which porous electrode element is not wetted by said electrolyte;

releasing said feedstock into said electrolyte at a point within a cavity formed in the bottom portion of said porous electrode element, said cavity being in direct communication with the bulk of said electrolyte, the upper portion of the inner wall surface of said cavity adjacent the top of said cavity being rendered relatively impermeable to gaseous materials by the application thereto of an impermeable coating having an uneven lower edge around the wall of said cavity;

substantially uniformly absorbing said feedstock into the pores of said porous electrode around said lower edge of said coating;

distributing said feedstock through said porous electrode element and therein at least partially reacting at least a portion of said feedstock; and recovering product and any remaining unreacted feedstock from said pores of said porous electrode element at a point spaced away from said cavity.

2. A process according to claim 1 wherein said first electrode element is an anode and said porous second electrode element is a cathode.

3. A process according to claim 2 wherein said cathode comprises porous carbon.

4. A process according to claim 3 wherein said lower edge has a configuration comprising repeating segments of a circle.

5. A process according to claim 4 wherein said impermeable coating is also applied to the top of said cavity.

6. A process according to claim 3 wherein said lower edge has a sawtooth configuration.

7. A process according to claim 6 wherein said impermeable coating is also applied to the top of said cavity.

8. A process for the electrochemical conversion of an organic feedstock, which process comprises:

passing an electric current through a current-conducting electrolyte composition contained in an electrolysis cell provided with a cathode and a porous anode which porous anode is not wetted by said electrolyte;

releasing said feedstock into said electrolyte at a point within a cavity formed in the bottom portion of said porous anode, said cavity being in direct communication with the bulk of said electrolyte, the upper portion of the inner wall surface of said cavity adjacent the top of said cavity being rendered relatively impermeable to gaseous materials by the application thereto of an impermeable coating having an uneven lower edge around the wall of said cavity;

substantially uniformly absorbing said feedstock into the pores of said porous anode around said lower edge of said coating;

distributing said feedstock through said porous anode and therein at least partially reacting at least a portion of said feedstock; and recovering product and any remaining unreacted feedstock from within said pores of said anode at a point spaced away from said cavity.

9. A process according to claim 8 wherein said anode comprises porous carbon.

10. A process according to claim 9 wherein said electrolyte composition comprises essentially anhydrous liquid hydrogen fluoride, and wherein said product is at least partially fluorinated.

11. A process according to claim 10 wherein said lower edge has a configuration comprising repeating segments of a circle.

12. A process according to claim 11 wherein said impermeable coating is also applied to the top of said cavity.

13. A process according to claim 10 wherein said lower edge has a sawtooth configuration.

14. A process according to claim 13 wherein said impermeable coating is also applied to the top of said cavity.

References Cited

UNITED STATES PATENTS

| | | | |
|---|---|---|---|
| 2,592,144 | 4/1952 | Howell et al. | 204—247 |
| 3,280,014 | 10/1966 | Kordesch et al. | 204—74 |
| 3,461,050 | 8/1969 | Childs | 204—59 |

FREDERICK C. EDMUNDSON, Primary Examiner

U.S. Cl. X.R.

204—72, 247, 278